Aug. 23, 1960  D. K. RICHARDSON  2,949,841
ENCLOSURE FOR AIRCRAFT COMPARTMENTS
Filed Oct. 22, 1957
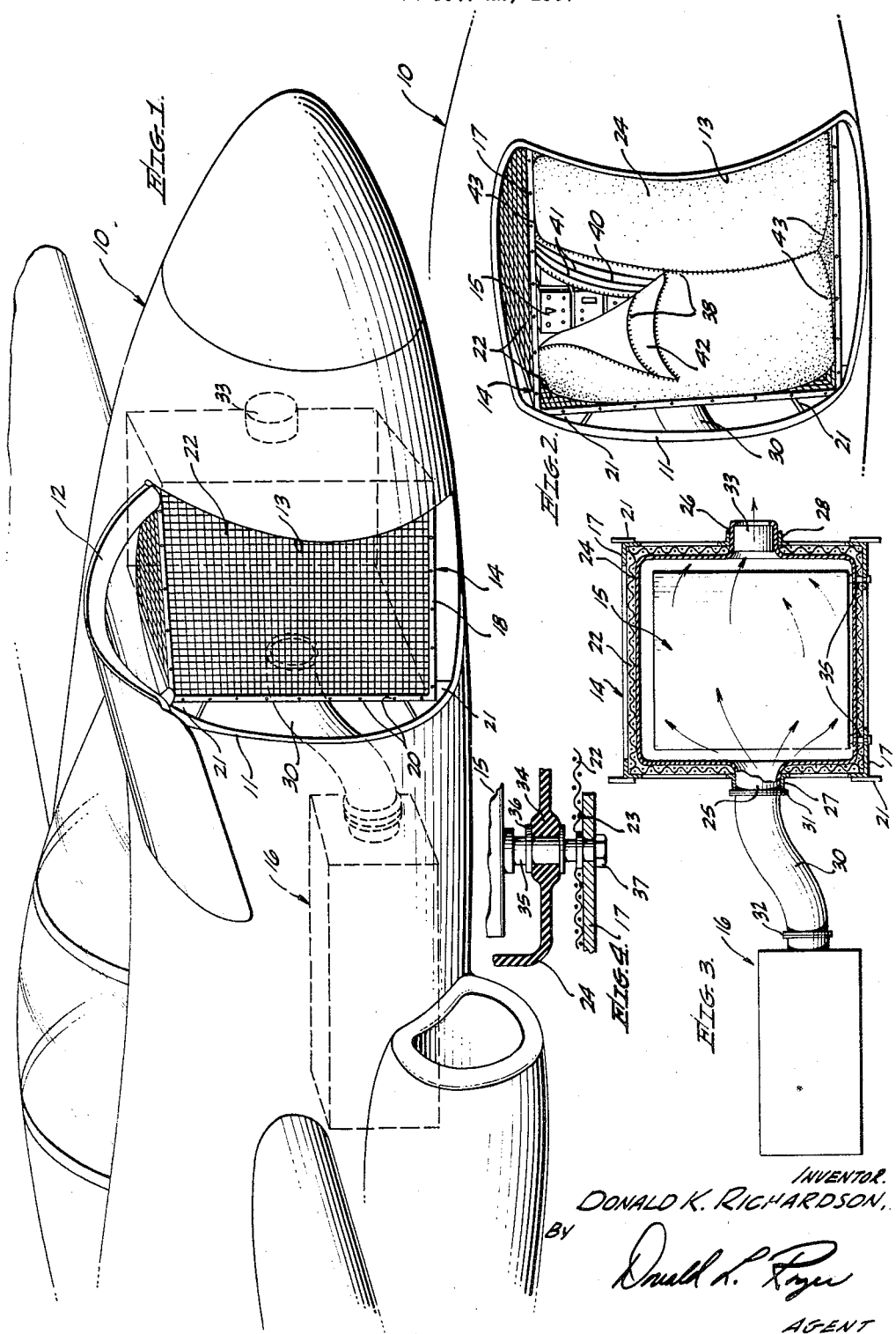
INVENTOR.
DONALD K. RICHARDSON,
BY
AGENT United States Patent Office 2,949,841
Patented Aug. 23, 1960

2,949,841

ENCLOSURE FOR AIRCRAFT COMPARTMENTS

Donald K. Richardson, Los Angeles, Calif., assignor to Hughes Aircraft Company, Culver City, Calif., a corporation of Delaware Filed Oct. 22, 1957, Ser. No. 692,515

8 Claims. (Cl. 98—1)

This invention finds particular utility in the field of pressurized enclosures and more particularly in connection with pressurized and air conditioned compartments as carried aboard aircraft, particular reference being made to such enclosures wherein electronic apparatus is carried.

Contemporary aircraft utilize a considerable amount of electronic apparatus in connection with various control systems thereof, radar, fire control apparatus, flight stabilization controls and other similar devices. In all such apparatus, many electrical and electronic components are employed that radiate a considerable amount of heat. In the absence of adequate ventilation of compartments containing such electronic devices, an undesirable temperature rise is experienced in the compartments, thus often creating a fire hazard and/or causing malfunctioning of the electronic equipment. Accordingly, inasmuch as most contemporary aircraft include apparatus for providing both air conditioning and pressurization air flows, it has become common practice to enclose such electronic equipment in a sealed compartment, to pressurize the compartment, provide a flow of air conditioning air therethrough and thereby to maintain the temperature in the compartment at a desired level.

Compartments in aircraft for electronic equipment have heretofore been constructed from relatively heavy cast or formed metal structures and panels, in order to be sufficiently rigid as to withstand the high pressure differential loading that is experienced at high altitudes, a differential of from 6/1 to 10/1 p.s.i. being normal. Such structures utilized in the construction of prior compartments have thus added considerably to the weight of the aircraft and reduced the effective payload of the aircraft. It is generally understood that for every pound of additional weight added in the form of equipment or apparatus within an airplane, an additional seven to ten pounds must be added to the over-all weight of the airplane in general size, wing loading, controls, engine, etc. Accordingly, it is important that the compartments surrounding various equipment be as light as possible, commensurate with the requirements for withstanding the required pressure differentials while still providing access to the compartment.

It is accordingly one important object of the invention to provide a novel pressurized enclosure construction.

Another object of the invention is to provide a novel enclosure for aircraft compartments, the construction thereof being relatively simple, light weight and efficient.

A further important object of the invention is to provide a novel method of containing pressurized air in an aircraft enclosure.

Still another object of the invention is to provide a novel aircraft enclosure having light weight and efficient structural characteristics and means for enabling easy access thereto.

A still further important object of the invention is to provide a novel flexible enclosure having means for supporting apparatus within such enclosure.

Other and further important objects of the invention will become apparent from the following detailed description, appended claims and accompanying drawing, wherein:

Figure 1 is a perspective view showing the present aircraft enclosure in connection with an aircraft;

Fig. 2 is a fragmentary perspective view of the present compartment showing a side panel removed to expose an inner liner thereof and access means thereto;

Fig. 3 is a partially diagrammatic sectional view showing the present enclosure and associated structures, and Fig. 4 is an enlarged fragmentary sectional view showing a means for mounting equipment within the present enclosure.

With reference to the drawing, an aircraft is indicated generally at 10. In the usual manner, the aircraft 10 includes a frame structure 11 to which an access panel 12 is connected. The panel 12 serves to provide a closure for an opening 13 in the aircraft fuselage. The particular enclosure structure of the present invention is shown as indicated generally at 14.

The enclosure structure 14 is adapted to enclose a quantity of equipment or the like as indicated generally at 15. The equipment 15 may be in the form of electronic devices, as contained in suitable chassis, and are mounted, as will be hereinafter more fully described, within the enclosure 14. The aircraft 10 is also provided with a suitable air conditioning and/or pressurization apparatus that is indicated generally at 16, in order to provide the desired air conditioning air under pressure for the enclosure 14.

As shown, the enclosure 14 includes a frame structure 17 that is composed of angle members disposed at corners thereof. The angle members of the structure 17 are secured together in any suitable manner such as by welding, preferably to define an integral structure, one side thereof being provided with a removable panel 18 that is secured to the frame structure 17 by means of suitable screws 20 or the like. The frame structure 17 is rigidly secured within the aircraft 10 and to the aircraft frame 11 as by brackets 21. The frame structure 17, together with the removable panel 18, serves to support outer peripheral edges of screen 22 that is secured to each of the frame structure members as by welding 23, Fig. 4.

As shown in Figs. 2 and 3, a flexible enclosure 24 is disposed within the confines of the screen 22 and is adapted for disposition in contact with inner surfaces of this screen. The flexible enclosure 24 may be made from any suitable flexible material such as, for example, plastic, rubber or the like, and, upon expansion thereof due to the presence of air within the enclosure, is restrained against outward movement by means of the screen 22. The enclosure 24 is provided with a pair of integral neck portions 25 and 26 that extend outwardly through the screen 22 and are supported therein by means of frame members 27 and 28 respectively. The neck portion 25 is connected to one end of a conduit 30, by means of a fitting 31, the other end of the conduit 30 being connected as at 32 to an outlet from the air conditioning and pressurization unit 16. The neck portion 26 may be connected to a suitable air outflow valve 33. The neck portion 26 may also be connected to a suitable conduit (not shown) to return air discharged from the enclosure to an inlet to the air conditioning unit 16.

In order to support the equipment 15 within the enclosure 14, as shown in Fig. 4, the flexible enclosure 24 is provided with annular enlargements or thickened portions 34 through which studs 35 extend. The studs 35 are connected to a lower portion of the equipment 15 and are provided with flanged portions 36 that are disposed on opposite sides of the annular thickened portions 34. Lower ends of the studs 35 are connected to the enclosure frame structure 17 and secured thereto by means of suitable nuts 37. Thus, the equipment 15 is rigidly supported relative to the aircraft frame 11 through the frame 17 of the present enclosure and flexible enclosure portion 24 thereof. An airtight seal is provided about the studs 35 by engagement of the portions 36 with the thickened portions 34.

In order to provide access to the equipment 15, the flexible enclosure 24 is provided with dual overlapping closure having a pair of zippers 38 along edges thereof. An underlying flap 40 formed in the flexible enclosure 24 is also provided with a plurality of longitudinal ribs 41 which serve to engage an inner surface of an outer flap 42 to provide the necessary seal between the closure zippers 38. Laterally extending zippers 43 with associated sealing flaps are also provided in the flexible enclosure 24, in order that portions of the enclosure may be folded back to provide access to the equipment 15.

It may thus be seen that a light weight and efficient enclosure has been provided for equipment carried aboard aircraft and that easy access means are provided for the compartment as well as providing means for maintaining a pressurized air conditioning air flow within and through the compartment. The particular size of the mesh of the screen 22, which serves to confine the flexible enclosure 24 and restrain outward movement thereof, is determined by the maximum pressure differential that is to be expected across the enclosure, together with the particular type and thickness of material employed in the enclosure portion 24. Pressure within the enclosure is maintained by means of the outflow valve 33 or other suitable valve arrangement as may be desired for particular installational situations.

Having thus described the invention and the present embodiment thereof, it is desired to emphasize the fact that many modifications may be resorted to in a manner limited only by a just interpretation of the following claims.

I claim:

1. An enclosure for use within aircraft comprising: a flexible enclosure housing; an open, generally rectilinear frame structure having a plurality of frame members joined together and disposed about said housing; light weight multiapertured panels carried by said frame structure and secured to said frame members thereof, walls of said housing being positioned in intimate contact with said panels; means for providing access to an interior of said housing; and means for connecting said housing to a source of air, said panels acting to restrain expansion of said flexible housing.

2. An enclosure for use within aircraft comprising: a flexible enclosure housing; an open, generally rectilinear frame structure having a plurality of frame members joined together and disposed about said housing; light weight multiapertured panels carried by said frame structure and secured to said frame members thereof, at least one of said panels being removably secured to said frame structure, walls of said housing being positioned in intimate contact with said panels; means for providing access to an interior of said housing; and means for connecting said housing to a source of air, said panels acting to restrain expansion of said flexible housing.

3. An enclosure for use within aircraft comprising: a flexible enclosure housing; an open, generally rectilinear frame structure having a plurality of frame members joined together and disposed about said housing; light weight multiapertured panels carried by said frame structure and secured to said frame members thereof, walls of said housing being positioned in intimate contact with said panels; means including an overlapping zipper attached seam for providing access to an interior of said housing; and means for connecting said housing to a source of air, said panels acting to restrain expansion of said flexible housing.

4. An enclosure for use within aircraft comprising, in combination: a flexible enclosure housing; an open, generally rectilinear frame structure having a plurality of frame members joined together and disposed about said housing; light weight multiapertured panels carried by said frame structure and secured to said frame members thereof, walls of said housing being positioned in intimate contact with said panels; means for providing access to an interior of said housing; means for connecting said housing to a source of air, said panels acting to restrain expansion of said flexible housing; and means for providing a controlled outflow of air from said housing.

5. An enclosure for use within aircraft comprising: a flexible enclosure housing; an open, generally rectilinear frame structure having a plurality of frame members joined together and disposed about said housing; light weight multiapertured panels carried by said frame structure and secured to said frame members thereof, at least one of said panels being removably secured to said frame structure, walls of said housing being positioned in intimate contact with said panels; means including an overlapping zipper attached seam for providing access to an interior of said housing; and means for connecting said housing to a source of air, said panels acting to restrain expansion of said flexible housing.

6. An enclosure for use within aircraft comprising, in combination: a flexible enclosure housing; an open, generally rectilinear frame structure having a plurality of frame members joined together and disposed about said housing; light weight multiapertured panels carried by said frame structure and secured to said frame members thereof, at least one of said panels being removably secured to said frame structure, walls of said housing being positioned in intimate contact with said panels; means for providing access to an interior of said housing; means for connecting said housing to a source of air, said panels acting to restrain expansion of said flexible housing; and means for providing a controlled outflow of air from said housing.

7. An enclosure for use within aircraft comprising, in combination: a flexible enclosure housing; an open, generally rectilinear frame structure having a plurality of frame members joined together and disposed about said housing; light weight multiapertured panels carried by said frame structure and secured to said frame members thereof, walls of said housing being positioned in intimate contact with said panels; means including an overlapping zipper attached seam for providing access to an interior of said housing; means for connecting said housing to a source of air, said panels acting to restrain expansion of said flexible housing; and means for providing a controlled outflow of air from said housing.

8. An enclosure for use within aircraft comprising, in combination: a flexible enclosure housing; an open, generally rectilinear frame structure having a plurality of frame members joined together and disposed about said housing; light weight multiapertured panels carried by said frame structure and secured to said frame members thereof, at least one of said panels being removably secured to said frame structure, walls of said housing being positioned in intimate contact with said panels; means including an overlapping zipper attached seam for providing access to an interior of said housing; means for connecting said housing to a source of air, said panels acting to restrain expansion of said flexible housing; and means for providing a controlled outflow of air from said housing.

References Cited in the file of this patent

UNITED STATES PATENTS

| 2,156,252 | Cichero | Apr. 25, 1939 |
| 2,511,877 | Protzeller | June 20, 1950 |
| 2,720,996 | Anderson | Oct. 18, 1955 |

FOREIGN PATENTS

| 193,453 | Great Britain | Feb. 26, 1923 |